United States Patent [19]

Hanada et al.

[11] Patent Number: 5,087,430
[45] Date of Patent: Feb. 11, 1992

[54] PROCESS FOR PURIFYING EXHAUST GAS

[75] Inventors: Masayuki Hanada; Morio Fukuda, both of Kitakyushu; Takeo Koshikawa, Ami; Akihiro Yamauchi, Koganei; Hiroshi Ogura, Yokohama, all of Japan

[73] Assignees: Mitsubishi Petrochemical Co., Ltd.; Mitsubishi Petrochemical Engineering Co., Ltd.; Chemicals Industries Co., Ltd., all of Tokyo, Japan

[21] Appl. No.: 500,244

[22] Filed: Mar. 27, 1990

[30] Foreign Application Priority Data

Mar. 28, 1989 [JP] Japan ................... 1-75420

[51] Int. Cl.$^5$ .............. B01J 8/00; C01B 21/00; C01B 17/00; C01B 25/00
[52] U.S. Cl. ................. 423/239; 423/213.2; 423/213.7; 423/244; 423/245.3
[58] Field of Search .......... 423/213.2, 213.7, 239, 423/239 A, 245.3, 244 A, 244 R

[56] References Cited

U.S. PATENT DOCUMENTS

| 3,025,133 | 3/1962 | Robinson et al. | 423/213.7 |
| 4,188,364 | 2/1980 | Gladden | 423/213.7 |
| 4,221,768 | 9/1980 | Inoue et al. | 423/213.2 |
| 4,374,103 | 2/1983 | Gandhi | 423/213.5 |
| 4,466,947 | 8/1984 | Imanari | 423/239 |
| 4,828,807 | 5/1989 | Domesle et al. | 423/213.7 |
| 4,855,115 | 8/1989 | Imanari et al. | 423/239 |

FOREIGN PATENT DOCUMENTS 0161743 11/1985 European Pat. Off. .

OTHER PUBLICATIONS

Patent Abstracts of Japan, vol. 5, No. 204 (C-85)[876], 24th Dec. 1981, p. 153 C 85; & JP-A-56 126 437 (Toyo Kogyo K.K.) 03-10-1981 *Whole abstract*.
Patent Abstract of Japan, vol. 3, No. 91 (C-54), 3rd Aug. 1979, p. 113 C 54; & JP-A-54 69 587 (Nippon Shokubai Kagaku Kogyo K.K.) 06-04-1979 *Whole abstract* & JP-B-59 011 340 (Cat. D).
Patent Abstracts of Japan, vol. 12, No. 202 (C-503)[3049], 10th Jul. 1988; & JP-A-63 4853 (Matsushita Electric Ind. Co., Ltd) 09-01-1988 *Whole abstract*.

Primary Examiner—Gregory A. Heller
Attorney, Agent, or Firm—Wenderoth, Lind & Ponack

[57] ABSTRACT

An exhaust gas containing a nitrogen oxides is passed at a temperature of 250° to 550° C. in the presence of a reducing agent through a catalyst bed filled with a molded denitration catalyst comprising at least the following three catalyst components (A) an oxide of at least one metallic element selected from the group consisting of Ti, Si and Zr,
(B) an oxide of at least one metallic element selected from the group consisting of Mo and W, and
(C) an oxide of V such that the concentrations of the oxide (B) and/or the oxide (C) in the exhaust gas inlet site of the catalyst bed are higher than in the other site thereof.

The molded denitration catalyst is also described.

3 Claims, 1 Drawing Sheet

PROCESS FOR PURIFYING EXHAUST GAS

This invention relates to a process for purifying an exhaust gas containing nitrogen oxides by reducing said nitrogen oxides and to a denitration catalyst molded article for use in it. More specifically, this invention relates to a catalyst for purification of an exhaust gas that makes non-toxic nitrogen oxides (principally NO, $NO_2$, etc. are hereinafter referred to as "NOx") in an exhaust gas in a heavy oil firing boiler, a coal firing boiler, a sintering furnace, a stationary diesel engine, etc. with a reducing agent such as ammonia, etc. by a catalytic reduction method, especially a catalyst showing excellent effects in purifying NOx of the exhaust gas in the diesel engine, and to a process for purifying an exhaust gas, especially an exhaust gas in the diesel engine.

As a catalyst to reduce NOx in an exhaust gas into non-toxic nitrogen with a reducing agent such as ammonia, there has been heretofore proposed a catalyst comprising a support composed mainly of titanium oxide and deposited thereon, an oxide of vanadium, tungsten or molybdenum as an active component. This catalyst is used in various shapes depending on characteristics of an exhaust gas being treated. For example, a catalyst to treat NOx in an exhaust gas containing large amounts of dusts in a heavy oil firing boiler, a coal firing boiler, etc. is used as a honeycomb structure. Japanese Patent Publication No. 11340/1984 discloses a honeycomb-type catalyst for purifying nitrogen oxides wherein a melt showing a catalytic activity is melt-adhered to and deposited on the end surface portion facing the gas flowing direction. It indicates that such catalyst improves its duration owing to prevention of the catalyst loss. However, in the treatment of NOx, hydrocarbon compounds and other toxic substances to the catalyst in the exhaust gas, the toxic substances to the catalyst are not considered with respect to catalytic activity and oxidation activity of sulfur oxides; the above patent is therefore not altogether satisfactory.

Meanwhile, Japanese Laid-open (Kokai) Patent Application No. 126437/1981 proposes a catalyst for purification of an exhaust gas of automobiles wherein the amounts of Pt and Rh being impregnated in a monolithic catalyst support are changed such that Pt is rich on an exhaust gas inlet side of the catalyst support but lean on an exhast gas outlet side thereof and Rh is lean on the exhaust gas inlet side of the catalyst support but rich on the exhaust gas outlet side thereof. There is a description that this catalyst purifies an exhaust gas containing hydrocarbon compounds, CO and NOx to improve performance of purifying CO and NOx.

Japanese Laid-open (Kokai) Patent Application No. 4853/1988 discloses a catalyst for purification of an exhaust gas in a combustion apparatus using a liquid fuel such as kerosene in which the amounts deposited of active components such as Pd, Pt, etc. are changed depending on positions of a support.

Japanese Laid-open (Kokai) Patent Application No. 24345/1983 also discloses a catalyst for treating an exhaust gas in which the amounts of active components are changed depending on positions of a support.

However, there are few catalysts used in a process for purifying NOx exhausted from a heavy oil firing boiler, a coal firing boiler, a sintering furnace, a stationary diesel engine, etc. with a reducing agent such as ammonia, etc., in which types and amounts of components having catalytic activity are changed in positions of the catalyst support depending on characteristics of the exhaust gas being treated. So far as the present inventors know, such catalyst is disclosed only in Japanese Patent Publication No. 48584/1988. Said Japanese Patent Publication No. 48584/1988 discloses, as a catalyst in which a vanadium compound is localized in an outermost surface portion of a catalyst molded article to suppress $SO_2$ oxidizability and enhance denitration activity, a denitration catalyst comprising as metallic components at least three components (A) titanium (component A),
(B) tungsten and/or magnesium (component B),
(C) vanadium (component C)

wherein titanium and tungsten are contained as oxides, magnesium and vanadium are contained in the form of oxides or sulfates or both, a vanadium compound is localized within a depth of 500 microns from the outermost surface of a porous molded article composed of a mixture of an oxide of the component A and an oxide of the component B and/or their sulfates with a component B/component A atomic ratio being 0.01 to 1, and the content of the vanadium compound in the vanadium compound localized portion is 0.3 to 6% by weight, calculated as vanadium pentoxide.

It is an object of this invention to provide a denitration catalyst for purifying an exhaust gas containing nitrogen oxides by reducing the nitrogen oxides.

Another object of this invention is to provide a catalyst molded article for purification of an exhaust gas by catalytic reduction which is suited for purifying an exhaust gas containing NOx and large amounts of hydrocarbons, sulfur oxides (hereinafter referred to as "SOx") including $SO_2$, etc.

Still another object of this invention is to provide a catalyst molded article especially suited for purifying an exhaust gas discharged from the diesel engine and containing NOx, SOx and dusts containing hydrocarbons owing to incomplete combustion (though the composition of the exhaust gas varies with a type of the diesel engine, a degree of output and burning conditions, the lower the content of NOx in the exhaust gas the higher the content of the hydrocarbons and soot, and the lower the content of the hydrocarbons and soot the higher the content of NOx).

A further object of this invention is to provide a catalyst in which in the exhaust gas inlet portion of the catalyst molded article, burning of the hydrocarbons is enhanced to prevent degradation of the catalytic activity due to the soot and hydrocarbons and the oxidation activity of SOx is kept low.

A still further object of this invention is to provide a process for purifying an exhaust gas by reducing NOx of the NOx-containing exhaust gas using the aforesaid catalyst of this invention.

The other object of this invention is to provide a process for purifying an exhaust gas of a diesel engine, above all, an exhaust gas of a stationary diesel engine.

The above objects and advantages of this invention can be achieved by, in accordance with this invention, a process for purifying an exhaust gas containing nitrogen oxides by passing it through a catalyst bed filled with a denitration catalyst in the presence of a reducing agent, characterized in that the nitrogen oxide-containing exhaust gas is passed at a temperature of 250° to 550° C. in the presence of a reducing agent through a catalyst bed filled with a molded denitration catalyst comprising at least the following three catalyst components (A) an oxide of at least one metallic element selected from the group consisting of Ti, Si and Zr,
(B) an oxide of at least one metallic element selected from the group consisting of Mo and W, and
(C) an oxide of V such that the concentrations of the oxide (B) and/or the oxide (C) in the exhaust gas inlet site of the catalyst bed is higher than in the other site thereof.

Figure 1:
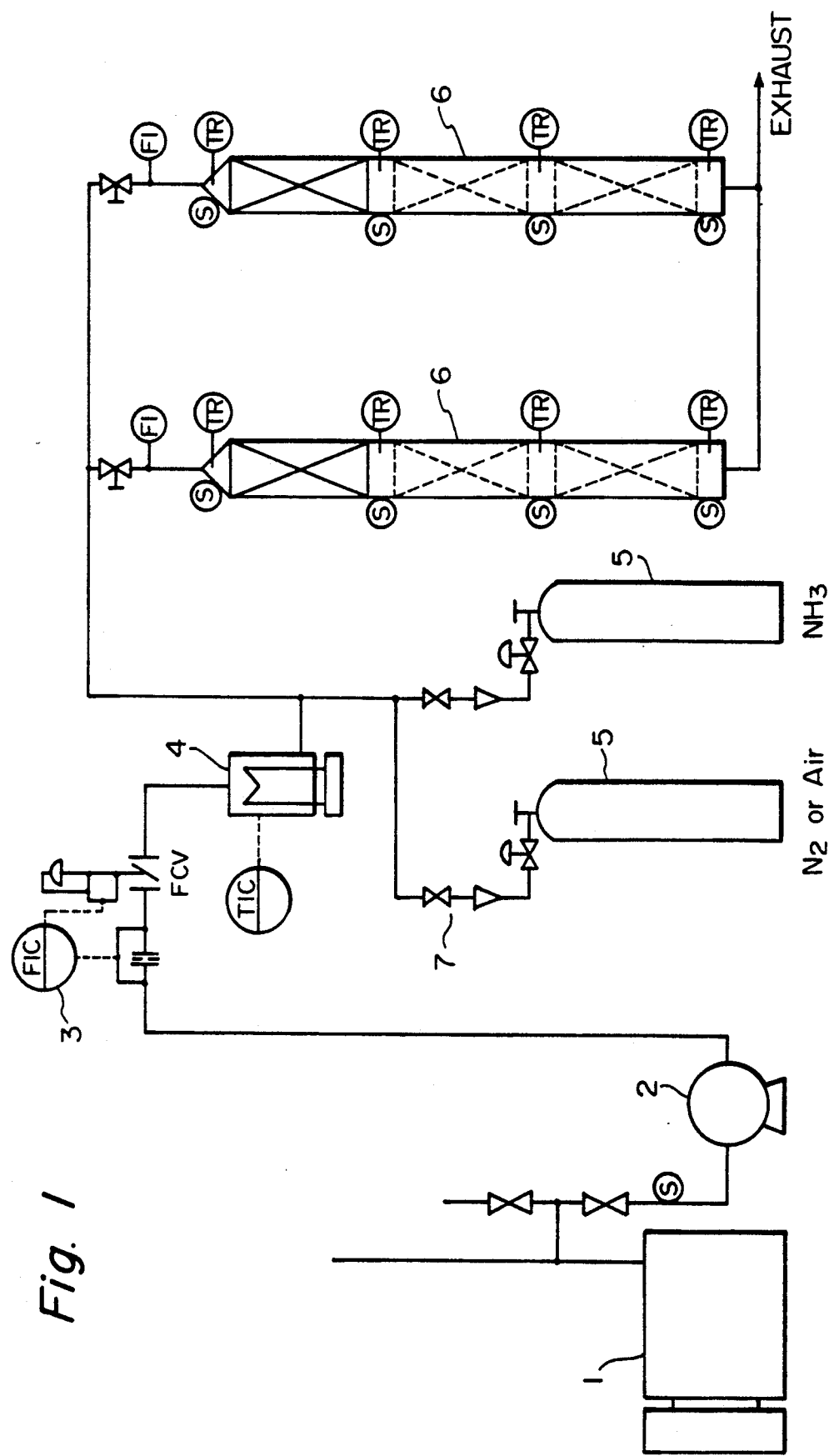
FIG. 1 is a rough sketch of a test apparatus for evaluating performance of the catalyst in the process of this invention.

The process of this invention is, as aforesaid, characterized in that when purifying the exhaust gas with the use of the catalyst comprising at least the components A, B and C, the concentrations of the component B and/or the component C in the site of the initial stage where the gas contacts the catalyst layer are relatively high.

As a method of providing the component B and/or the component C in the catalyst bed with the aforesaid concentration difference or gradient, there is a method in which the aforesaid concentration difference or gradient of the component B and/or the component C is formed in each catalyst molded article itself, or a method in which a catalyst molded article containing the component B and/or the component C in high concentrations of 1.1 to 10 times compared to a standard catalyst molded article used in the other portion than the exhaust gas inlet side is separately prepared, and only the catalyst bed portion on the exhaust gas inlet side is filled with the catalyst molded article containing the component B and/or the component C in high concentrations and the other portion is filled with the standard catalyst molded article to form the concentration difference or gradient of the component B and/or the component C in the catalyst bed.

The denitration catalyst used in this invention comprises, as stated above, at least the three components (A), (B) and (C).

The component (A) is an oxide of at least one metallic element selected from the group consisting of Ti, Si and Zr. Examples of the oxide as the component (A) are oxides such as titanium oxide, silica and zirconia; and composite oxides such as titania-silica, titania-zirconia, and titania-silica-zirconia. Of these, titanium oxide is most preferable. The component (A) in the catalyst filled in the other site than the exhaust gas inlet site of the catalyst bed occupies preferably 55 to 98.9% by weight, more preferably 60 to 97.8% by weight based on said catalyst in said other catalyst site.

The component (B) is an oxide of at least one metallic element selected from the group consisting of Mo and W. Examples of the oxide as the component (B) are molybdenum oxide and tungusten oxide. The component (B) filled in the other site than the exhaust gas inlet site of the catalyst bed occupies preferably 1 to 44.9% by weight, more preferably 2 to 39.8% by weight based on said catalyst in said other catalyst site.

The oxide as the component (C) is an oxide of V, i.e. vanadium oxide. The component (C) in the catalyst filled in the other site than the exhaust gas inlet site of the catalyst bed is preferably 0.1 to 5% by weight, more preferably 0.2 to 4% by weight based on said catalyst in said other catalyst site.

In the process of this invention, the weights of the component (B) and/or the component (C) in the catalyst filled in the exhaust gas inlet site of the catalyst bed are preferably about 1.1 to 10 times, more preferably 2 to 8 times the weights of the component (B) and/or the component (C) in the catalyst filled in the other site than the exhaust gas inlet site of the catalyst bed.

The catalyst used in the process of this invention may contain, besides the above components (A), (B) and (C), the other oxide components or the other metallic components, if required. Examples of the other components can be Pt, Pd, Cr and Cu and oxides of these metallic elements. When the other components are noble metals such as Pt, Pd, etc., they can be contained in amounts of not more than 1% by weight based on the catalyst. When the other components are oxides of Cu, Cr, etc., they can be contained in amounts of not more than 10% by weight based on the catalyst.

The catalyst used in the process of this invention can take varied forms depending on a substance being incorporated therein. For example, it can take forms having flow channels of an exhaust gas being treated, such as honeycomb, parallel plate, and cylindrical structures. When the catalyst is particularly used to purify the exhaust gas of the diesel engine, the honeycomb-type catalyst is preferable. More preferable is a honeycomb-type catalyst in which a corresponding diameter of a flow channel (a sectional area of a flow channel $\times 4 \div$ a flow channel inner circumferential length) is 2 to 10 mm, preferably about 3 to 7 mm, a sectional area of the catalyst molded article is about 200 to 600 $cm^2$ and a length is about 50 to 200 cm.

In the catalyst used in the process of this invention, the concentrations of the components (A), (B) and (C) in the catalyst filled in the other site than the exhaust gas inlet site of the catalyst bed may either be uniform or have a gradient; the concentrations of the components (A), (B) and (C) in the catalyst filled in the exhaust gas inlet site of the catalyst bed may also either be uniform or have a gradient.

In performing the process of this invention, the above catalyst is first filled in the catalyst bed such that the concentrations of the component (B) and/or the component (C) in the exhaust gas inlet site of the catalyst bed are higher than in the other site thereof. When the denitration catalyst is made of e.g. a catalyst molded article having exhaust gas flow channels with the concentrations of the oxide (B) and/or the oxide (C) in one end site of the channels being higher than in the other site thereof, the aforesaid state can be provided by filling the catalyst molded article in the catalyst bed such that the site having the higher concentrations of the component (B) and/or the component (C) is made the exhaust gas inlet site of the catalyst bed. When the denitration catalyst is made of a catalyst molded article having exhaust gas flow channels with the concentrations of the oxide (B) and/or the oxide (C) being substantially uniform in all sites, the aforesaid state can also be provided by preparing at least two catalyst molded articles different in concentrations of the oxide (B) and/or the oxide (C), filling the catalyst molded article having the higher concentrations of the oxide (B) and/or the oxide (C) in the exhaust gas inlet site of the catalyst bed and the other catalyst molded article having the lower concentrations of the oxide (B) and/or the oxide (C) in the exhaust gas outlet site of the catalyst bed.

In practising the process of this invention, the catalyst bed may be either in a single stage or in multiple stages in the passing direction of the exhaust gas. The catalyst in each stage of the multi-stage catalyst bed can be one filled with the catalyst molded article as noted above.

The foregoing catalyst molded article having the exhaust gas flow channels with the concentrations of the oxide (B) and/or the oxide (C) in one end site of the flow channels being higher than in the other site thereof is proposed by the present inventors, constituting part of this invention.

That is, the denitration catalyst in this invention is a molded denitration catalyst for reducing nitrogen oxides in an exhaust gas in the presence of a reducing agent, said molded denitration catalyst comprising at least the following three catalyst components, (A) an oxide of at least one metallic element selected from the group consisting of Ti, Si and Zr,
(B) an oxide of at least one metallic element selected from the group consisting of Mo and W, and
(C) an oxide of V, and having exhaust gas flow channels, the concentrations of the oxide (B) and/or the oxide (C) in the exhaust gas inlet site of the flow channels being higher than in the other site thereof.

Such catalyst of this invention has of course the aforesaid varied forms; the honeycomb structure is especially preferable.

When the above catalyst is e.g. 120 cm long in the direction of the exhaust gas flow channels, the concentrations of the oxide (B) and/or the oxide (C) are higher in a zone of up to 30 cm, preferably up to 2 to 20 cm from one end site of the exhaust gas flow channels.

The process of this invention is performed by passing the nitrogen oxide-containing exhaust gas through the catalyst bed filled with the above-prepared catalyst at a temperature of 250° to 550° C. in the presence of a reducing agent.

The contact temperature is preferably 300° to 500° C., more preferably 320° to 450° C.

In accordance with the process of this invention, the catalyst used purifies the exhaust gas containing NOx as well as SOx and soot and hydrocarbons to achieve a high rate of NOx removal and a low oxidation rate of $SO_2$ and is greatly effective for removal of the soot and hydrocarbons by firing, making it possible to bring forth excellent effects that the soot and hydrocarbons are less adhered to the catalyst and the pressure loss is minimized. In other words, it can oxidatively remove the soot and hydrocarbons liable to adhere to the specific part of the catalyst bed on the exhaust gas flow inlet side, minimize oxidation of SOx and show a high rate of NOx removal. It is characterized in that as aforesaid, the catalysts different in oxidation activity are located to the exhaust gas flow direction to conduct the denitration reaction.

The exhaust gas composition in the stationary diesel engine somewhat varies with the type of the diesel engine, the combustion conditions, etc. For example, the exhaust gas contains about 750 to 2000 ppm of NOx, 10 to 2000 ppm of SOx and about 20 to 200 mg/Nm³ of the soot and hydrocarbons. In case of purifying an exhaust gas containing large amounts of NOx, SOx and soot and hydrocarbons, such as a diesel engine exhaust gas, the use of a denitration catalyst having high oxidizability to remove the soot and hydrocarbons by firing decreases the amounts of the soot and hydrocarbons but increases oxidation of SOx. Meanwhile, when a denitration catalyst with oxidizability of SOx suppressed is used, the soot and hydrocarbons are not removed by firing and thus adhered to the denitration catalyst, decreasing the catalytic activity. This invention has solved such problems by locating the specific catalyst of this invention on the exhaust gas flow inlet side.

When the process of this invention is performed on an exhaust gas of 320° C. or lower, it is advisable that in order to make enough a combustion activity of the catalyst and prevent or minimize adhesion of unburnt substances, the exhaust gas is first intermittently heated by an external heater, etc. preferably to about 350° C. or higher and then passed through the catalyst.

A linear velocity of the exhaust gas in the catalyst flow channels varies with a target rate of denitration. When an attempt is made to obtain a rate of denitration of 50% or more, it is preferably 2 to 30 m/sec, more preferably 2 to 15 m/sec.

A general composition of an exhaust gas in a stationary diesel engine is approximately as follows. The process of this invention shows excellent effects for purifying the exhaust gas of such composition. Needless to say, it can also be used to purify an exhaust gas of a composition outside the above range.

NOx: 700–2,000 ppm
Soot and hydrocarbons: 20–200 mg/Nm³ (except at the start-up)
SOx: 10–2,000 ppm
$O_2$: 10–15%
$H_2O$: 4–6%
$CO_2$: 4–6%

In particular, the process of this invention shows excellent effect for purifying an exhaust gas containing, besides NOx, as large as 30 to 1000 ppm of SOx and as large as 50 to 120 mg/Nm³ of soot and hydrocarbons.

The catalyst used in this invention can be produced as follows, for example.

A given amount of a precursor of a component (B) is added to hydrated titanium oxide being a precursor of titanium oxide as a component (A), and the mixture is dried and burned to prepare a titanium oxide powder containing the component (B). To the powder are added a given amount of the precursor of the component C, a clay, a molding aid and inorganic fibers, and they are kneaded. The kneaded product is then extrusion-molded into a desirous shape, and the molded article is dried and burned. Given amounts of the precursors of the component (B) and/or the component (C) are further deposited on one end of the resulting catalyst molded article, and the resulting product is then calcined to give the catalyst of this invention. The component (B) and/or the component (C) can be deposited by a known method of impregnating the precursors of the component (B) and/or the component (C) in a desirous portion of one end corresponding to the gas flow inlet side of the catalyst molded article and conducting spraying and coating.

Examples of the precursor of the component (B) are ammonium paratungstate, tungstic acid, ammonium metatungstate and ammonium paramolybdate. Examples of the precursor of the component (C) are ammonium metavanadate, vanadyl sulfate and vanadyl oxalate.

This invention, as will be specifically clarified from the following Examples and Comparative Examples, can bring forth excellent effects for purifying the exhaust gas in e.g. the stationary diesel engine such that while minimizing the corrosion of the apparatus or the oxidation reaction of $SO_2$ undesirous in formation of acid ammonium sulfate, adhesion of the soot and hydrocarbons to the catalyst and release of them into the ambient atmosphere are suppressed and the denitration activity is less degraded after 1000 hours.

The following Examples and Comparative Examples illustrate this invention specifically. However, this invention is not limited to these Examples only.

The performance of the catalyst in said Examples and Comparative Examples was evaluated in accordance with a "Catalyst performance test method" described below.

The reaction conditions are as follows.
Exhaust gas temperature: 345° C.
Space velocity: 5000 hr$^{-1}$
Composition of the exhaust gas (main components):
  NO: 930-950 ppm
  SOx: 72-78 ppm
  SO$_3$ in SOx: 0.8-2.5 ppm
  O$_2$: 12-13%
  H$_2$O: 4.7-4.9%
  CO$_2$: 5.0-5.3%
  Soot and hydrocarbons: 30-50 mg/NM$^3$
NH$_3$ feed amount (NH$_3$/NO): 1.0 mole ratio Catalyst performance test method)

FIG. 1 is a rough sketch of a test apparatus that evaluates performance of a catalyst in the process of this invention.

A combustion exhaust gas discharged from a diesel engine 1 was blown to a denitration reaction device by a blower 2. The temperature of the exhaust gas controlled to a given flow rate by a flow rate indication adjusting portion 3 was adjusted by a gas heater 4 and the exhaust gas was fed to a denitration reaction column. Ammonia was supplied from an ammonia supply portion 5. In order to sufficiently mix ammonia with the exhaust gas by dispersion, ammonia was diluted with air or nitrogen if required and introduced into the system.

Two denitration reaction columns 6 filled with the catalyst were mounted in parallel. Each of said columns was filled with up to three layers of catalysts each having a catalyst length of 120 cm.

The gas temperature in the denitration reaction column was measured by a temperature indication recorder (TR), and the gas analysis was conducted such that the gas was collected from a sampling portion indicated at (S) and analyzed.

Regarding the gas analysis, NOx was measured by a chemiluminescence-type NO/NOx analyzer (Model 951, a machine of Toshiba - Beckman), and the total SOx analysis and the SO$_3$ analysis were performed by a method according to JIS K0103-1977.

The gas sampling in the total SOx analysis was conducted in accordance with JIS K0095-1979. The SO$_3$ analysis was conducted by collecting a SO$_3$ mist with a spiral tube-type collector.

The SO$_2$ concentration was found by subtracting the SO$_3$ concentration from the total SOx concentration. The denitration performance was evaluated from the measured value of NO.

In regard to the material adhered to the catalyst, its overall amount was found from a value obtained by brushing off the material adhered to the 25 flow channels in respect of the catalyst after the 1000-hour denitration reaction test with a micro-brush, collecting it and measuring the weight thereof. Considering drop-off, etc. of the adhered material in withdrawing the catalyst, the visual observation of the adhered state was also taken into account.

EXAMPLE 1

(1) Aqueous ammonia was added to 2400 kg of a slurry of hydrated titanium oxide (30% by weight as TiO$_2$) being a starting material of titanium oxide formed by a sulfuric acid method to adjust pH to 8.5. Subsequently, 90 kg of ammonium paratungstate was added, and the mixture was kneaded and concentrated with heating.

The resulting cake was dried and then calcined at 600° C. for 5 hours to obtain a powder composed of titanium oxide and tungsten oxide.

To 716 kg of the powder were added 24 kg of a clay, 56 kg of glass fibers, 51.5 kg of an organic plasticizer and an aqueous solution containing 5.143 kg of ammonium metavanadate, and they were kneaded by a kneader.

While heating the kneaded substance, its water content was properly adjusted for extrusion-molding. Thereafter, the substance was extrusion-molded into a raw honeycomb-type molded article having a 16 cm square section by an extrusion-molding machine.

The resulting raw molded article was dried and calcined at 500° C. for 3 hours, and then cut to a length of 120 cm to obtain a calcined molded article (A) having a 15 cm square and a length of 120 cm.

The honeycomb-type molded article (A) had in the section a total of 625 flow channels (25 flow channels in one side) each having a 5 mm square.

(2) Separately, 730 g, calculated as V$_2$O$_5$ of vanadyl sulfate was dissolved in deionized water to obtain 10 liters of a solution.

One end (15 cm) of the above calcined molded article (A) having the length of 120 cm was dipped in this solution for 1 minute, and then raised. After water was drained, the molded article was dried and calcined at 500° C. for 3 hours to afford a catalyst in EXAMPLE 1.

This catalyst contained 2.9% by weight, calculated as V$_2$O$_5$, of vanadium in a portion in which the vanadium component was dipped.

(3) Using the catalyst in EXAMPLE 1, the denitration activity, the SO$_2$ oxidation activity and the amount of the substance adhered to the catalyst were evaluated according to the aforesaid catalyst performance test method, and the results are shown in TABLE 1.

COMPARATIVE EXAMPLE 1

The calcined molded article (A) (before dipped in the vanadyl sulfate solution) obtained in (1) of EXAMPLE 1 was made a catalyst in COMPARATIVE EXAMPLE 1.

Using this catalyst, the performance of the catalyst was evaluated in the same way as in (3) of EXAMPLE 1. The results are shown in TABLE 1.

EXAMPLE 2

In the calcined molded article (A) obtained as in (1) of EXAMPLE 1 was dipped a vanadium component as in (2) of EXAMPLE 1 under the following dipping conditions to prepare a catalyst. The performance of the catalyst was evaluated as in (3) of EXAMPLE 1.

The dipping conditions are as follows.
Dipping solution: 1040 g, calculated as V$_2$O$_5$, of vanadyl sulfate was dissolved in deionized water to give 10 liters of a solution.
Dipping time: 1 minute
Length of a dipped portion: 10 cm
Calcining conditions: 500° C., 3 hours This catalyst contained 4.1% by weight, calculated as $V_2O_5$, of vanadium in the vanadium dipped portion.

EXAMPLE 3

(1) Twenty four kilograms of a clay, 56 kg of glass fibers, 51.5 kg of an organic plasticizer and an aqueous solution of 15.6 kg of ammonium metavanadate were added to 716 kg of a powder composed of titanium oxide and tungsten oxide which was obtained as in EXAMPLE 1, and they were kneaded by a kneader.

While heating the kneaded product, its water content was properly adjusted for extrusion-molding. Subsequently, the kneaded product was extrusion-molded into a raw honeycomb-type molded article having a 16 cm square section by an extrusion-molding machine.

The resulting raw molded article was dried, calcined at 500° C. for 3 hours and cut to a length of 120 cm to afford a calcined molded article (B) having a 15 cm square and a length of 120 cm.

The honeycomb-type molded article (B) had in the section a total of 625 flow channels (25 flow channels in one side) each having a 5 mm square.

(2) Separately, 7.3 kg, calculated as $V_2O_5$, of vanadyl sulfate was dissolved in deionized water to obtain 100 liters of a solution.

One end (10 cm) of the above calcined molded article (B) having the length of 120 cm was dipped in this solution for 1 minute, and then raised. After water was drained, the molded article was dried, and calcined at 500° C. for 3 hours to obtain a catalyst in EXAMPLE 3.

This catalyst contained 4.2% by weight, calculated as $V_2O_5$, of vanadium in a portion in which the vanadium component was dipped.

(3) Using this catalyst, the performance of the catalyst was evaluated as in (3) of EXAMPLE 1, and the results are shown in TABLE 1.

COMPARATIVE EXAMPLE 2

The calcined molded article (B) (before dipped in the vanadium component) obtained in (1) of EXAMPLE 3 was made a catalyst in COMPARATIVE EXAMPLE 2.

Using this catalyst, the performance of the catalyst was evaluated as in (3) of EXAMPLE 1. The results are shown in TABLE 1.

COMPARATIVE EXAMPLE 3

Using the calcined molded article (B) obtained in (1) of EXAMPLE 3, a catalyst was prepared in which the content of the vanadium component was high from the gas inlet side through the gas outlet side of the catalyst.

The dipping conditions of the vanadium component were the same as in EXAMPLE 3 except that the whole of the calcined molded article (B) having the length of 120 cm was dipped in the dipping solution.

This catalyst contained 4.1% by weight, calculated as $V_2O_5$, of vanadium throughout.

The performance of the resulting catalyst was evaluated as in (3) of EXAMPLE 1. The results are shown in TABLE 1.

EXAMPLE 4

A tungsten component and a vanadium component were dipped in the calcined molded article (A) obtained in (1) of EXAMPLE 1, and dried and calcined at 500° C. for 3 hours to obtain a catalyst.

The content of tungsten in the dipped portion was 10.1% by weight, calculated as $WO_3$ and the content of vanadium was 1.9% by weight, calculated as $V_2O_5$.

The performance of the catalyst was evaluated as in (3) of EXAMPLE 1. The results are shown in TABLE 1.

The dipping conditions are as follows.
Dipping solution: 429 g, calculated as $WO_3$, of ammonium metatungstate and 429 g, calculated as $V_2O_5$, of vanadyl sulfate were dissolved in deionized water to give 10 liters of a solution.
Dipping time: 1 minute
Length of a dipped portion: 10 cm

EXAMPLE 5

(1) Aqueous ammonia was added to 2400 kg of a slurry of hydrated titanium oxide (30% by weight, calculated as $TiO_2$) being a starting material of titanium oxide formed by a sulfuric acid method to adjust pH to 8.5. Subsequently, 98.2 kg of ammonium paramolybdate was added, and the mixture was kneaded and concentrated by heating.

The resulting cake was dried and then calcined at 600° C. for 5 hours to obtain a powder composed of titanium oxide and molybdenum oxide.

To 716 kg of this powder were added 24 kg of a clay, 56 kg of glass fibers, 50 kg of an organic plasticizer and an aquous solution containing 5.143 kg of ammonium metavanadate, and they were kneaded by a kneader.

While heating the kneaded substance, its water content was properly adjusted for extrusion-molding. Thereafter, the substance was extrusion-molded into a raw honeycomb-type molded article having a 16 cm square section by an extrusion-molding machine.

The resulting raw molded article was dried, calcined at 500° C. for 3 hours, and then cut to a length of 120 cm to afford a calcined molded article (C) having a 15 cm square and a length of 120 cm.

The honeycomb-type molded article (C) had in the section a total of 625 flow channels (25 flow channels in one side) each having a 5 mm square.

(2) One end (10 cm) of the above calcined molded article (C) having the length of 120 cm was dipped in the dipping solution used in (2) of EXAMPLE 1 for 1 minute and then raised. After water was drained, the molded article was dried and calcined at 500° C. for 3 hours to afford a catalyst in EXAMPLE 5.

(3) The performance of the catalyst was evaluated under the same conditions as in (3) of EXAMPLE 1, and the results are shown in TABLE 1.

COMPARATIVE EXAMPLE 4

The calcined molded article (C) obtained in (1) of EXAMPLE 5 was made a catalyst in COMPARATIVE EXAMPLE 4.

Using this catalyst, the performance of the catalyst was evaluated in the same way as in (3) of EXAMPLE 1. The results are shown in TABLE 1.

EXAMPLE 6

(1) To 716 kg of the powder composed of titanium oxide and tungsten oxide, obtained in (1) of EXAMPLE 1, were added 24 kg of a clay, 56 kg of glass fibers, 1.92 kg of vanadyl sulfate ($VOSO_4$) and 350 liters of deionized water, and they were kneaded by a kneader. While heating the kneaded substance, its water content was properly adjusted for extrusion-molding. The substance was then extrusion-molded into a raw honeycomb-type molded article having a 16 cm square section by an extrusion-molding machine.

The resulting raw molded article was dried, calcined at 550° C. for 3 hours, and then cut to a length of 120 cm to afford a calcined molded article having a 15 cm square and a length of 120 cm.

This honeycomb-type molded article had in the section a total of 625 flow channels (25 flow channels in one side) each having a 5 mm square.

(2) Separately, 100 liters of an aqueous solution containing 35% by weight, calculated as $WO_3$, of ammonium metatungstate was prepared. One end (10 cm) of the above calcined molded article having the length of 120 cm was dipped in this solution for 1 minute, then dried and calcined at 550° C. for 3 hours to obtain a catalyst in EXAMPLE 6.

This catalyst contained 17% by weight, calculated as $WO_3$, of tungsten in a portion in which the tungsten component was dipped.

(3) Using this catalyst, the performance of the catalyst was evaluated by the aforesaid catalyst performance test method except that the exhaust gas temperature was changed to 490° C. The results are shown in TABLE 1.

(C) an oxide of V such that the concentrations of either the oxide (B) or the oxide (C) or both in the exhaust gas inlet site of the catalyst bed are higher than in the other end site thereof, wherein the catalyst in the end site other than the exhaust gas inlet site of the cataylst bed comprises 55 to 98.9% by weight of the component (A), 1 to 44.9% by weight of the component (B) and 0.1 to 5% by weight of the component (C), and wherein the weights of either component (B) or the component (C) or both in the catalyst filled in the exhaust gas inlet site of the catalyst bed are about 1.1 to 10 times the weights of either component (B) or the component (C) or both in the catalyst filled in the end site other than the exhaust gas inlet site of the catalyst bed, said honeycomb-type catalyst having flow channels of a diameter of 2 to 10 mm, a sectional area of about 200 to 600 $cm^2$ and a length of about 50 to 200 cm.

2. The process of claim 1 wherein the catalyst bed is filled with one honeycomb-type catalyst having exhaust as flow channels, the concentrations either oxide (B) or the oxide (C) or both in the exhaust gas inlet site of the honeycomb-type catalyst being higher than in the other end site thereof.

3. The process of claim 1 wherein the catalyst bed is filled with at least two honeycomb-type catalysts having exhaust gas flow channels, wherein in each of the honeycomb-type catalyst, the concentrations of either the oxide (B) or the oxide (C) or both are substantially uniform in all sites, said at least two honeycomb-type catalysts having different concentrations of either the oxide (B) or the oxide (C) or both relative to each other, and wherein the honeycomb-type catalyst having the higher concentrations of either the oxide (B) or the oxide (C) or both is located in the exhaust gas inlet site of the catalyst bed and the honeycomb-type catalyst having the lower concentrations of either the oxide (B) or the oxide (C) or both is located in the exhaust gas outlet site of the catalyst bed, respectively.

TABLE 1

| | Gas inlet site | | | Other site than the gas inlet site | | | Length of a dipped portion (cm) | Rate of NOx removal [Initial value] (%) | Rate of $SO_2$ oxidation [Initial value] (%) | Adhered material (after 1000 hrs.) | Adhered state | Pressure loss $mmH_2O$/ 120 cm | Rate of NOx removal [after 1000 hrs.] |
|---|---|---|---|---|---|---|---|---|---|---|---|---|---|
| | $V_2O_5$ | $WO_3$ | $MoO_3$ | $V_2O_5$ | $WO_3$ | $MoO_3$ | | | | | | | |
| Example 1 | 2.9 | 8.7 | 0 | 0.5 | 8.9 | 0 | 15 | 97.6 | 0.8 | 2.5 | a bit | 32 | 95.6 |
| Example 2 | 4.1 | 8.6 | 0 | 0.5 | 8.9 | 0 | 10 | 97.6 | 0.8 | 1 | little | 30 | 97.5 |
| Example 3 | 4.2 | 7.0 | 0 | 1.5 | 7.2 | 0 | 10 | 98.6 | 4.1 | 1 or less | little | 30 | 98.6 |
| Example 4 | 1.9 | 10.1 | 0 | 0.5 | 8.9 | 0 | 10 | 97.4 | 0.6 | 3.2 | a bit | 31 | 95.5 |
| Example 5 | 3.0 | 0 | 8.7 | 0.5 | 0 | 8.9 | 10 | 97.6 | 1.0 | 2.3 | a bit | 32 | 95.6 |
| Example 6 | 0.12 | 17.0 | 0 | 0.14 | 8.9 | 0 | 10 | 97.3 | 0.5 | 1.3 | little | 30 | 97.3 |
| Comparative Example 1 | 0.5 | 8.9 | 0 | 0.5 | 8.9 | 0 | — | 97.2 | 0.5 | 34 | thick | 60 or more | 92.3 |
| Comparative Example 2 | 1.5 | 7.2 | 0 | 1.5 | 7.2 | 0 | — | 98.4 | 3.5 | 12 | thin | 44 | 95.4 |
| Comparative Example 3 | 4.1 | 7.0 | 0 | 4.1 | 7.0 | 0 | 120 | 99.6 | 11.0 | 1 or less | little | 30 | 99.5 |
| Comparative Example 4 | 0.5 | 0 | 8.9 | 0.5 | 0 | 8.9 | — | 97.3 | 0.7 | 28 | thick | 60 or more | 93.4 |

What we claim is:

1. A process for purifying an exhaust gas containing nitrogen oxides, sulfur oxides, and soot and hydrocarbons, by passing it through a catalyst bed filled with a denitration catalyst in the presence of ammonia, characterized in that the exhaust gas is passed at a temperature of 250° to 550° C. in the presence of ammonia through a catalyst bed filed with at least one honeycomb-type denitration catalyst having flow channels for the exhaust gas, said catalyst comprising at least the following three catalyst components (A) an oxide of at least one metallic element selected from the group consisting of Ti, Si and Zr, (B) an oxide of at least one metallic element selected from the group consisting of Mo and W, and